May 11, 1965 R. G. PETER 3,183,044
DRILL BIT
Filed Nov. 5, 1962 3 Sheets-Sheet 1
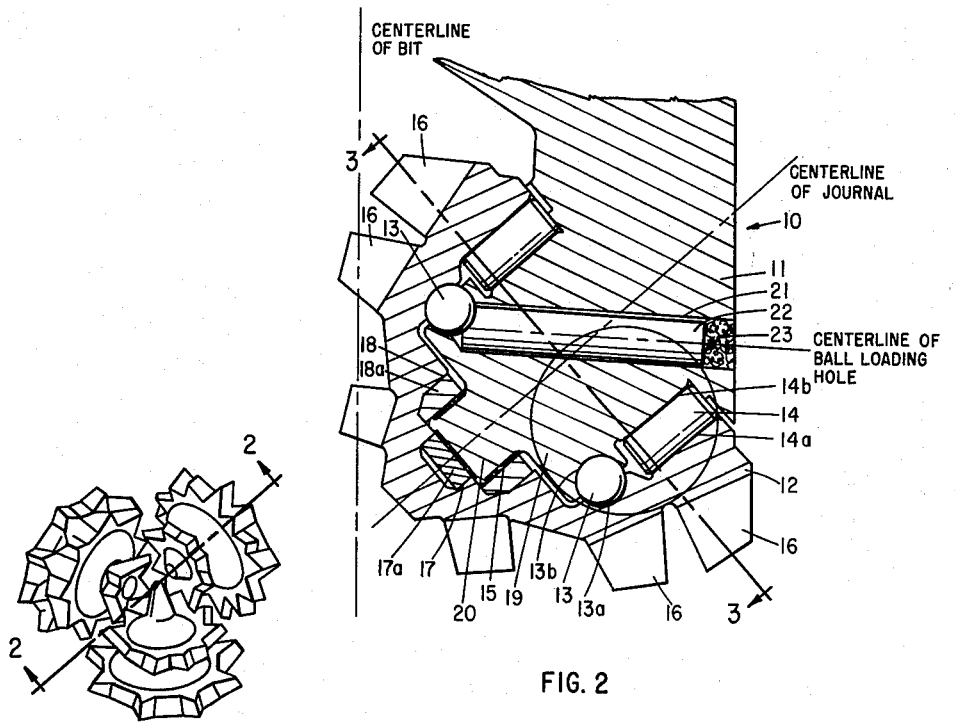
FIG. 2
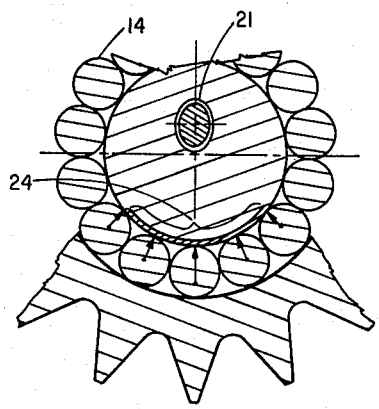
FIG. 1
FIG. 3
ROBERT G. PETER,
INVENTOR.

May 11, 1965    R. G. PETER    3,183,044
DRILL BIT

Filed Nov. 5, 1962    3 Sheets-Sheet 2

ROBERT G. PETER,
INVENTOR.

May 11, 1965 R. G. PETER 3,183,044
DRILL BIT
Filed Nov. 5, 1962 3 Sheets-Sheet 3

ROBERT G. PETER,
INVENTOR.

United States Patent Office
3,183,044
Patented May 11, 1965

3,183,044
DRILL BIT
Robert G. Peter, 2532 Swift St., Houston, Tex.; Juanita
G. Peter, executrix of said Robert G. Peter, deceased
Filed Nov. 5, 1962, Ser. No. 235,190
18 Claims. (Cl. 308—8.2)

This invention relates to improvements in drill bits generally and, more particularly, to improvements in rock bits having closed-ended conical cutters mounted by means of antifriction bearings on nonrotating cantilevered journal shafts and rotatably interlocked therewith by means of ball thrust bearing elements.

Cone bits have come to be generally recognized as the standard of the industry. This is evidenced by the fact that the majority of bit manufacturers offer this type bit and that the overwhelming majority of bits produced in this counry today are of this type.

The life of these standard bits, as measured by bearing endurance, is generally recognized as being less than desired. This point has been demonstrated in recent years by the fact that when such standard bits are equipped with sintered carbide tooth elements, they have a performance potential, as measured by tooth life, which generally greatly exceeds the useful life of the supporting bearing structure. The extent of this disparity is demonstrated by the fact that these carbide-toothed bits often require several rebuildings, i.e., the successive remounting of these carbide toothed cones on a series of new bearing structures, to extract the useful life of original carbide teeth.

This standard bit employs a hybrid friction-antifriction bearing assembly to rotatably mount the rolling cone cutting elements utilized. In order to achieve the rugged construction necessary to transmit drilling weights (may range upwardly of 80,000 pounds) to the formation being drilled, the standard bit has a fixed nonrotating journal. As a result of this fixed-journal construction, a small segmental or arcuate portion of each journal raceway is continuously exposed to and must continuously absorb all of the drilling load transmitted to the journal by the roller or ball bearings as they move or progress across this portion. Published photoelastic studies reveal that, at any point of time, the load so transmitted is transmitted substantially through a small number of line-shaped contact areas progressing across the load bearing segment as the ball and roller bearings planetate about their respective journal raceways at a speed in proportion to the rotational speed of the cone which may range in the neighborhood of 400 r.p.m. As a consequence of this loading, this segmental portion of the journal is repetitively highly stressed and sooner or later begins to fail in fatigue and flakes off carburized steel particles from its load bearing surface. The time of commencement of flaking is known to be a function of drilling weight and total number of revolutions. After flaking commences, the dislodged hard carburized steel particles generally interact with the roller and ball bearings to raise the stresses further and failure of the entire drill bit as a drilling tool is accelerated. Ultimate failure is usually associated with the cones eventually locking on the journal shafts, skidding flat and being lost in the bore hole, if the bit is not pulled in time.

The users and makers of rock bits have been acutely aware of the above shortcomings and this awareness has led to the employment of relatively large numbers of engineering, research, and metallurgical personnel over the past 20 years or so in the course of a continued effort to improve bearing and/or rock bit performance. This effort has been principally along the lines of seeking to "beef-up" the journal by providing better high-alloy steels, improved heat treatment processes, improved grain flow in the forging process, as well as providing sealed bearing assemblies with lubricators. The design of the standard rock bit evolved out of an endless effort involving reshuffling of sizes, fits, clearances, and design geometry.

During this period, the ball loading and other passageways piercing the load carrying journal, as well as plug or retainer elements which may have been employed for "plugging" the same, have received little attention. At most, this attention has been directed to the elimination of sudden gross and complete failures. One example of such a gross failure arises from the ball loading passageway being so large in relation to the journal diameter that the journal will fail in transverse shear under load. Another example is caving of the bearing surface of the journal arising out of a passageway being in such close underlying relation to a journal load bearing surface that it fails locally when loaded. To eliminate these types of failure, the ball loading hole in a standard bit is usually arranged far enough away from the loaded segments of raceways such that failure by caving is generally avoided and the hole is usually of a diameter such that the transverse shearing strength of the journal is acceptable. Otherwise, and as they may relate to apparent endurance or fatigue life of the journal load bearing surfaces, holes piercing the journal have been ignored.

It is a principal object of this invention to raise the overall performance level of standard rock bits by the provision of means for altering the dynamic stress system heretofore characteristically produced in the bearing journals thereof in order to minimize destructive effect.

Another object of the invention is to provide a new and improved bearing assembly having a higher effective endurance limit or life than generally similar bearings employed in prior art rock bits.

Still another object of the invention is the provision of an improved bearing structure wherein stress reversals in the journal underlying its load bearing surfaces are effectively minimized.

A further object of the invention is the provision of a new and improved bearing structure wherein the magnitude of stress variation induced in the journal underlying the principal load bearing surface thereof is substantially reduced.

A still further object of the invention is the provision of a new and improved bearing structure wherein the time of commencement of flaking, pitting or spalling of the load bearing segments of the antifriction raceways thereof is postponed to thereby extend bearing life.

Another object of the invention is the provision of a new and improved rock bit journal including stress wave transmission means disposed therein to transmit stress-waves communicated thereto from the loaded segments of the raceways thereof into other regions of the journal.

Other and further objects of the invention will be obvious upon an understanding of the illustrative embodiments about to be described, or will be indicated in the apepnded claims, and various advantages not referred to herein will occur to one skilled in the art upon employment of the invention in practice.

Preferred embodiments of the invention have been chosen for purposes of illustration and description. The preferred embodiments illustrated are not intended to be exhaustive nor to limit the invention to the precise form disclosed. They are chosen and described in order to best explain the principles of the invention and their application in practical use to thereby enable others skilled in the art to best utilize the invention in various embodiments and modifications as may be best adapted to the particular uses contemplated.

In the drawings:
FIGURE 1 is a worm's eye view of a cone rock bit;
FIGURE 2 is a somewhat enlarged sectional view taken along line 2—2 of FIG. 1 but having an upper portion broken away;

FIGURE 3 is a partial transverse sectional view taken along line 3—3 of FIG. 2;

Figure 4:
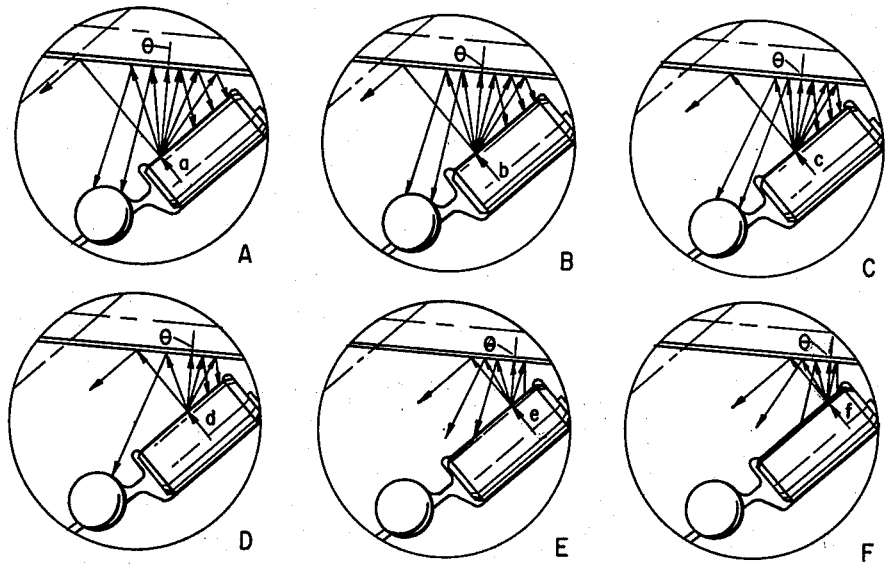
FIGURES 4A-4F are somewhat diagrammatic and greatly simplified illustrations showing stress wave or pulse propagation from various points of loading along the journal load bearing portion shown encircled in FIG. 2.

The cutting cones of a 3-cone rock bit are shown in FIG. 1. Each comprises a portion of a cone-lug subassembly generally indicated as 10 in FIG. 2. Typically, the upper portion 11 (shown partially broken away) of a number of such mating subassemblies 10 are joined to comprise a unitary drill bit head structure (not shown) which is adapted for rotary drilling in a manner well known in the art.

The subassembly 10 is comprised of a lug-journal piece 11 on which a cone 12 is rotatably mounted in longitudinally interlocked relation by means of ball bearings 13, roller bearings 14 and friction bearing 15.

The cone 12 is shown as having integral tooth elements 16 arranged in annular rows on its outer surface. These tooth elements are spaced longitudinally so as to interfit with the tooth elements of other associated cones (FIG. 1) which, of course, appropriately differ in longitudinal position and spacing. Although the integral type of tooth element is shown, similarly or differently arranged carbide insert or other tooth elements may be employed. The bore of cone 12 is comprised of ball and roller raceways, 13a and 14a respectively, in which complements of ball and roller bearings 13 and 14 respectively run, friction thrust button cavity 17 housing thrust button 17a, and friction bushing conuterbore 18 housing friction bushing 18a.

The journal portion 19 of lug-journal piece 11 also has suitable ball and roller raceways, 13b and 14b respectively positioned to cooperate with the complements of ball and roller bearings. In addition, the journal portion 19 may have a distal extension 20 appropriately surfaced with a suitable hard metal for frictional running engagement with friction thrust button 17a and friction bushing 18a.

The subassembly of FIG. 2 is locked in assembly by introducing the complement of ball bearings ito the complementary raceways 13a and 13b after the cone 12 is placed about the journal portion 19 and the rollers 14 which, of course, would have been previously placed in the roller race 14b. The ball bearings 13 are introduced through a ball loading hole or passageway 21 which then effectively filled to retain the balls in the complementary ball raceways by a ball-loading plug or retainer 22. The plug is then normally welded in place by a weld 23. It should be noted that, in bits of standard construction, the ball-loading plug or retainer 22 only "plugs" the ball loading hole or passageway in the sense of blocking passage of balls inasmuch as a clearance is always provided between the diameter of the plug or retainer, although perhaps not always illustrated in drill bit drawings because of its seeming lack of importance as compared to other drill bit design details.

Ball loading holes in a cone bit may be generally described as diagonally penetrating the body of the journal roller raceways portion (as viewed in longitudinal section) to permit the insertion of balls 13 into the complementary ball raceways 13a and 13b. This diagonal arrangement permits a straight loading hole 21, the use of a single straight retainer or plug 22, and uninterrupted ball raceways in the cone and also on the journal insofar as it is affected by principal loads in normal operation.

In further detail, it is to be noted that the centerline of the ball loading hole 21 in the standard bit journal is substantially coplanar with both the centerline of the journal and with the centerline of the bit and, in addition, is coplanar with a load line or cylindrical line element (geometric) of the journal disposed within the load bearing segment 24 of the roller raceway (to be more fully described). Stated a different way, in a longitudinal sectional view (FIG. 2) wherein both the journal centerline and the bit centerline lie substantially in the plane of the paper, the centerline of the ball loading hole also lies substantially in the plane of the paper.

The previously mentioned clearance between the plug 22 and the hole or passageway 21 of the standard bit renders the surface of the hole or passageway effective as a free surface reflector of stress waves or pulses, as will appear. Further, with the hole or passageway 21 disposed as it in exposed relation, i.e., unshielded relation, to the load bearing segments or portions of the ball and roller raceways of the journal, this free surface reflector is disposed to transmit stress waves impinging thereon back into portions of the journal immediately underlying the critical arcuate areas or load-bearing segments, such as 24 in FIG. 3.

These reflected stress waves or pulses operate to increase the degree of stress reversal to which these critical load bearing segments are exposed and needlessly subtract from their effective endurance by accelerating the time of commencement of flaking or pitting failure.

In operation under drilling loads, a very complex dynamic system of stresses is generated in the journal by the substantially line contact loading imposed as successive rollers come under load and progress across the load-bearing segment of the journal surface. The generated stress system emanates from the several moving line loadings (FIG. 4) where the few roller bearings 14 under the load at any given time contact the raceways. As one of these contact load lines progresses across a given cylindrical elemental line portion of the journal load bearing segment, a rather high compressive stress is suddenly produced along the particular elemental line portion and is emanated inwardly of the line into the body of the journal as a wave or pulse. Beyond this, the actual stress propagation is extremely complicated and not readily describable.

However, a comparatively uncluttered picture of the dynamic stress system within the journal may be presented in the light of the following simplifying assumptions. The elemental line portions of the journal are uniformly loaded along their length by the moving line contacts. Points along these line portions may be separately considered as being impulsively loaded. The point loadings emanate stress waves or pulses which are spherically divergent. The wave or pulse produced by each of the point loadings is comprised of a rather sharp high peak-valued initial or leading compressive stress phase arising directly from the loading and a following less-sharp lower-valued tensile stress phase due to elastic recovery of the journal material after the leading compressive stress peak passes.

FIGS. 4A-4F are a series in which each schematically shows the dynamic stress system arising from individual point loadings, i.e., arrows a through f spaced along a single line contact within the critical load bearing segment 24 of the roller race 14b. In each of the series, other arrows, which spherically diverge from the point loadings, illustrate stress wave or pulse propagation directions within the material of the journal. In each of the several figures of the series 4A–4F, there is a particular arrow $\theta$ which impinges perpendicularly on the ball loading hole surface.

It has been pointed out that the surface of the ball loading hole 21 is effective as a free-surface reflector. From the FIGS. 4A–4F, it is seen that arrows impinging on the ball loading hole to the right of arrow $\theta$ in each case are propagated to the right thereof and that arrows impinging to the left are propagated to the left thereof; this being in accordance with well-known laws of reflection.

When a stress pulse strikes a reflective free boundary such as the surface of the ball loading hole 21, it will be reflected in inverted form, i.e., transformed with its leading compression component or phase reflected as a tensile stress component or phase of substantially equal value and its original tensile component or phase reflected as a compressive stress component or phase of substantially equal value. The assumed pulse form will be transformed and transmitted by the ball loading hole surface as a 2-component pulse having a high-peaked tensile leading phase followed by a somewhat lower valued compressive phase. This leading high peaked tension phase of the reflected or transformed pulse is believed to be a major contributing cause of premature flaking or spalling failure of standard rock bit journal load bearing segments, as will be described.

The direction of reflection of arrows (representative of pulse portion direction) impinging to the right and left of arrows $\theta$ have been noted. It will be noted further that those arrows to the left are generally reflected and dispersed to dissipate in regions of the journal body remote from the roller bearing raceway load bearing segment. The portions of the initial pulse that do not impinge on the ball loading hole surface will, of course, propagate, disperse, and decay in the journal and/or journal-lug portions without contributing substantially to the flaking failure other than by their initial traverse of the journal body regions underlying the load bearing surface.

It is the portions of the initial pulse impinging on and reflected by the ball loading hole surface to the right of the various arrows $\theta$ or, more specifically, the reflected high peaked tensile phases thereof, which appear to be most damaging. As seen in FIGS. 4A–4F, these latter described pulse portions (arrows) are directed back toward regions underlying the load bearing segment substantially undiminished in intensity. This latter point is reasonable in view of the relatively short round trip distances involved. From an examination of FIGS. 4A–4F as superimposed in the mind's eye, it is realized that in addition to functioning as a reflector, the ball loading hole surface also may be said to focus or concentrate these reflected pulse portions with their high leading tensile stress phases into load bearing surface regions within the outboard (or right hand) half of the load bearing segment of the journal roller raceway. These concentrated reflected pulses raise both the effective magnitude of stress range and the number of stress reversals in this outboard half portion of the load bearing segment which, in turn, lowers the effective endurance limit of this race portion.

Of course, unequal loadings along a bearing load line are more likely than the assumed uniform loading and this could either make the foregoing effect stronger or shift the point of failure to inboard portion of the journal raceway.

Due to the complexity of the actual unsimplified dynamic stress situation within the journal body there may be other phenomena, such as pulse interference, resonant effects and plastic range stress propagation for example, taking place which may add to the above considerations in contributing to the lowering of the effective endurance of the journal.

In addition to the foregoing, it may be that the ball raceway 13b has its effective endurance limit lowered in a similar manner. Also, reflected pulses originally emanating from the roller raceway may damage the ball race and vice versa. The suggestion of this inter-raceway effect is shown by arrows in FIGS. 4A–4D.

The improvement of this invention is embodied in rock bit cutter-bearing-journal subassemblies shown to various extents in FIGS. 5–10. These improved assemblies or embodiments are comprised of components which are generally similar in form, function and nomenclature to the components described in connection with the standard subassembly 10. Because of this similarity, the following description will be facilitated by employing similar reference characters with primes affixed thereto to denote the various similar components, etc.

The various embodiments about to be described accomplish the general objective of the invention variously by reorientation of the reflective surface of passageways penetrating the journal body with respect to the load bearing raceway segments thereof, by providing for impedance matching of the journal passageway surfaces so that stress waves will be transmitted therethrough rather than be reflected thereby, and by providing the journal passageways with surfaces disposed to widely diffuse any stress waves impinging on and reflected therefrom.

Figure 5:
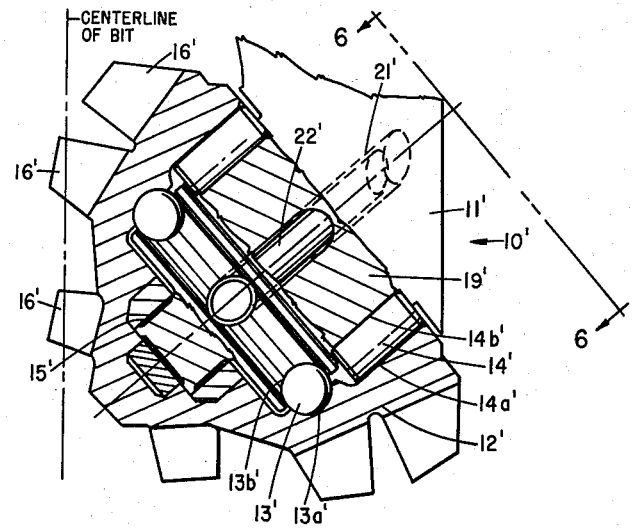
FIGURE 5 is a sectional view (oriented similarly to FIG. 2) of a preferred embodiment of the invention.
Figure 6:
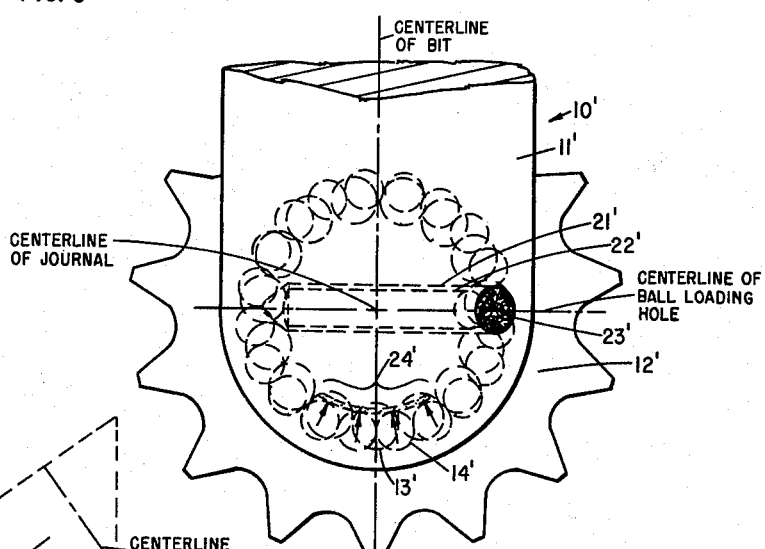
FIGURE 6 is an end view taken along line 6—6 of FIG. 5.
Figure 7:
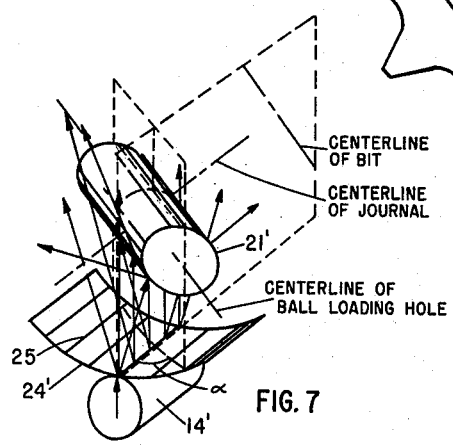
FIGURE 7 is a somewhat diagrammatic pictorial view showing the relation of the envelope surface of the load bearing segment of the journal roller raceway to the surface defining the ball loading hole as shown in FIGS. 5 and 6 together with a greatly simplified illustration of stress wave or pulse propagation through the journal from the load bearing line of a single roller bearing.

In FIGS. 5 and 6, an improved cone bearing journal subassembly or embodiment is shown wherein the ball loading hole 21' is oriented in unshielded or exposed relation with respect to the load bearing arcuate surface or segment 24' of the journal such that the hole centerline is not substantially coplanar with the plane defined by the centerline of the journal 19' and the centerline of the bit nor is it coplanar with any load line 25 of the journal (see FIG. 7) disposed within the load bearing arcuate area or segment 24' of the roller raceway. Stated another way, the ball loading passageway or hole 21' is disposed within the journal 19' such that the centerline of the hole or passageway is substantially included within a plane defined by the centerline of the journal 19' and a point on the surface of the roller raceway 14b' lying outside or spaced from the central portion of the arcuate load bearing area portion or segment 24' thereof. FIG. 7 shows the spacial relationship of the envelope surface of the load bearing segment 24' to the envelope of ball loading hole 21' in a pictorial manner to further or facilitate understanding.

In being so oriented, the ball loading hole or passageway 21', although still active as a reflector of stress pulses, has a reduced reflected pulse focusing effect insofar as the critical load bearing arcuate area or segment 24' is concerned. As a consequence, the reoriented ball loading hole tends to reduce the effective magnitude and number of stress reversals in the raceway segment 24' and thus, indirectly raises the effective or apparent endurance limit of the improved journal as compared to the journal embodied in the standard rock bit.

Figure 8:
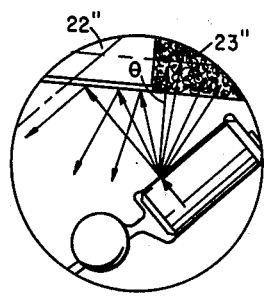
FIGURE 8 is a partial longitudinal sectional view of a modified form of the invention.

FIG. 8 shown an embodiment of the invention wherein an impedance matching principle is utilized so that the ball loading hole 21' wil conduct rather than reflect the stress pulses impinging thereon to the right of arrow $\theta$. In this embodiment, a ball loading plug 22" is employed which is secured by a deep penetrative weld 23". This deep penetrative weld substantially eliminates the reflective hole surface by uniting the outboard portion of the ball loading plug with the journal material in its immediate vicinity to provide a pulse conducting bridge substantially matched in impedance with that of the material of the journal body. Other impedance matching means might be utilized such as, installation of the ball loading plug with a press or interference fit within the ball loading hole. Another impedance matching means might employ a filler having suitable impedance characteristics within the clearance betwen the ball loading hole and the ball loading plug and in stress wave conducting contiguity to the surface of each.

Figure 9:
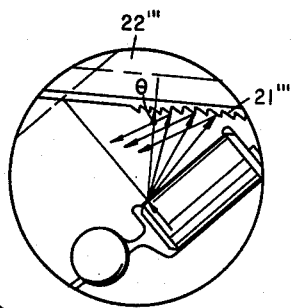
FIGURE 9 is a partial longitudinal sectional view of another modified form of the invention.

FIG. 9 shows another form of the invention wherein the ball loading hole 21''' is suitably threaded with a saw tooth thread form in order to provide a surface adapted to widely disperse stress pulse reflections and thereby prevent concentration of reflected pulses within the region underlying the load bearing arcuate area or segment of the journal. The effect is, as in the other forms of the invention, the raising of the effective or apparent endurance limit and overall utility of the rock bit in which it is embodied.

Figure 10:
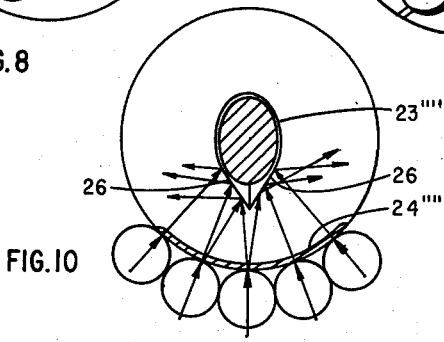
FIGURE 10 is a partial transverse sectional view of still another modified form of the invention.

FIG. 10 shows another form of the invention wherein a different means of altering the stress wave or pulse reflection pattern is employed. Here the cross-sectional shape of the ball loading hole 23'''' is altered, as by broaching, to provide the hole with an angular corner facing the load bearing segment 24''''. The surfaces 26 comprising the angular corner function as stress pulse reflecting mirrors adapted to substantially direct the reflected stress pulses out of the region wherein they may lower the effective endurance of the rock bit.

These various illustrated embodiments may, of course, be utilized in combination to perhaps attain even more advantageous effects.

Thus, it has been seen the instant invention provides a new and improved journal having a substantially increased endurance limit which effectively raises the overall performance level of rock bits in which it is embodied. It has been seen also that this improved performance is achieved by minimizing the concentration of reflected stress waves or pulses within the portions of the journal which underlie the load bearing arcuate areas or segments of the anti-friction bearing raceways with the result that the stress range and number of stress reversals to which these areas or segments are exposed is substantially reduced.

As various changes may be made in the form, construction and arrangement of the parts herein without departing from the spirit and scope of the invention and without sacrificing any of its advantages, it is to be understood that all matter herein is to be interpreted as illustrative and not in any limiting sense.

What is claimed is:

1. A drill bit comprising: at least one support including a journal portion; a cutter mounted on said journal portion and having a bore including a ball raceway and a roller raceway; said journal portion including a ball raceway and a roller raceway respectively complementary to said ball and roller raceways of said cutter and providing principal load bearing arcuate surfaces disposed to support the principal loads encountered by said drill bit while drilling; roller bearings in said complementary roller raceways rotatably mounting said cutter on said journal portion; ball bearings in said complementary ball raceways longitudinally interlocking said cutter on said journal portion; a ball retainer diagonally extending within said journal portion and directly above said load bearing arcuate surfaces and including a surface in ball bearing conducting relation to the ball raceway of said journal portion; and means, disposed in said journal portion in coextensive relation to said ball retainer and in unshielded relation to stress waves transmitted toward said ball retainer from said principal load bearing arcuate surfaces, for transmitting stress waves impinging thereon in directions within said journal such that stress wave concentration in journal portions immediately underlying said principal load bearing arcuate surfaces is minimized, to thereby enhance the apparent endurance thereof.

2. A drill bit comprising: at least one support having a cheek surface adapted to confront a borehole wall; a journal carried by said support; a cutter supported by said journal and having a bore including a ball raceway and a roller raceway; said journal including a ball raceway and a roller raceway respectively complementary to said ball and roller raceways of said cutter and providing principal load bearing arcuate surfaces disposed to support the principal loads experienced by said drill bit while drilling; roller bearings in said complementary roller raceways rotatably mounting said cutter on said journal; ball bearings in said complementary ball raceways longitudinally interlocking said cutter with respect to said journal; a ball bearing retainer transversely extending within said support and journal in a direction intersecting said cheek surface of said support and including an end in ball bearing conducting relation to the ball raceway of said journal; and means, disposed in said journal and support in coaxial relation to said ball retainer and in unshielded relation to stress waves transmitted theretoward from the principal load bearing arcuate surface of said roller raceway of said journal, for transmitting stress waves impinging thereon in directions within said journal such that stress wave concentration under said principal load bearing arcuate surface of said roller raceway of said journal is minimized.

3. A drill bit comprising: at least one support having a cheek surface adapted to confront a borehole wall; a journal including journal ball and roller raceways carried by said support; a cutter supported by said journal and including a bore providing cutter ball and roller raceways respectively complementary to said journal raceways; complements of ball and roller bearings respectively in said complementary ball and roller raceways longitudinally interlocking and rotatably mounting said cutter with respect to said journal and adapted to progress about the journal as the cutter is rotated under load, such that at any time only a few bearings of each complement transmit the principal drilling loads from said cutter to said journal; arcuate bearing surfaces within said raceways defined by the progressing of said few bearings thereacross under load; a ball retainer diagonally disposed within said journal and directly above said arcuate load bearing surfaces, in a direction intersecting said cheek surfaces and in ball retaining relation to said journal ball raceways; and means, between said ball retainer and said arcuate load roller bearing raceway of said journal and in unshielded relation to said arcuate bearing surfaces, for transmission of stress waves emanating from said arcuate bearing surface of said roller raceway of said journal toward said means and impinging thereon in directions such that concentration of reflected stress wave energy within said journal immediately underlying said arcuate bearing surfaces is minimized.

4. The drill bit of claim 3 wherein said means for transmission comprises the free surface of a passageway housing said ball retainer and said passageway has its centerline disposed within a plane defined by the centerline of said journal and a point in the surface of one of said journal raceways spaced from the central portion of the arcuate surface thereof.

5. The drill bit of claim 3 wherein said means for transmission provides an impedance match between said journal and said retainer for conducting stress waves impinging thereon thereacross.

6. The device of claim 5 wherein said impedance match is provided by a press fit relation between said retainer and said journal.

7. The drill bit of claim 3 wherein said means for transmission comprises the free surface of a passageway housing said ball retainer, and said free surface is corrugated in nature, whereby stress waves impinging thereon are widely diffused.

8. A drill bit comprising: at least one support having a cheek surface adapted to confront a borehole wall and including a journal portion; a cutter supported by said journal portion and having a bore including a ball raceway and a roller raceway; said journal portion including a ball raceway and a roller raceway respectively complementary to said ball and roller raceways of said cutter and providing principal load bearing arcuate surfaces disposed to support the principal loads experienced by said drill bit while drilling; roller bearings in said complementary roller raceways rotatably mounting said cutter on said journal portion; ball bearings in said complementary ball raceways longitudinally interlocking said cutter with respect to said journal portion; a ball bearing retainer transversely extending within said support and the journal portion thereof in a direction intersecting said cheek surface and including an end in ball bearing conducting relation to the ball raceway of said journal portion; and means, disposed in said journal portion between said ball bearing retainer and said principal load bearing surfaces and having a portion in unshielded relation to stress waves transmitted toward said ball bearing retainer from said principal load bearing arcuate surfaces, for propagating stress waves which impinge thereon in directions within said journal portion such that the number of stress waves traversing journal portions underlying said principal load bearing arcuate surfaces is minimized.

9. A drill bit comprising: at least one support having a cheek surface adapted to confront a borehole wall and including a journal portion; a cutter mounted on said journal portion and having a bore including a ball raceway and a roller raceway; said journal portion including a ball raceway and a roller raceway respectively complementary to said ball and roller raceways of said cutter and providing principal load bearing arcuate surfaces disposed to support the principal loads encountered by said drill bit while drilling; roller bearings in said complementary roller raceways rotatably mounting said cutter on said journal portion; ball bearings in said complementary ball raceways longitudinally interlocking said cutter on said journal portion; a ball retainer diagonally extending within said journal portion in a direction intersecting said cheek surface of said ball support and including a surface in ball bearing conducting relation to the ball raceway of said journal portion; and means directly over said principal load bearing arcuate surfaces effective to divert stress waves impinging thereon in directions away from said principal load bearing arcuate surfaces.

10. A drill bit comprising: at least one support having a cheek surface adapted to confront a borehole wall and including a journal portion; a cutter supported by said journal portion and having a bore including a ball raceway and a roller raceway; said journal portion including a ball raceway and a roller raceway respectively complementary to said ball and roller raceways of said cutter and providing principal load bearing arcuate surfaces disposed to support the principal loads experienced by said drill bit while drilling; roller bearings in said complementary roller raceways rotatably mounting said cutter on said journal portion; ball bearings in said complementary ball raceways longitudinally interlocking said cutter with respect to said journal portion; a ball bearing retainer transversely extending within said journal portion and said support in a direction intersecting said cheek surface and including an end in ball bearing conducting relation to the ball raceway of said journal portion; and means, encompassed by said journal portion raceway and disposed in said journal portion intermediate said ball retainer and said arcuate surfaces and in unshielded relation to stress waves transmitted from said principal load bearing arcuate surfaces theretoward, for receiving and transmitting stress waves impinging thereon in directions within said journal portion such that stress wave concentration under said principal load bearing arcuate surfaces is minimized.

11. A drill bit comprising: at least one support having an outboard surface adapted to confront a borehole wall; said support including a journal having ball and roller raceways; a cutter, supported by said journal, including a bore providing cutter ball and cutter roll raceways respectively complementary to said journal raceways; complements of ball and roller bearings respectively in said complementary ball and roller raceways longitudinally interolcking and rotatably mounting said cutter with respect to said journal and adapted to progress about the journal as the cutter is rotated under load, such that at any time only a few bearings of each complement transmit the principal drilling loads from said cutter to said journal; arcuate bearing segments within said raceways defined by the progressing of said few bearings thereacross under load; and means in said journal encircled by said journal roller raceway in unshielded relation to said bearing segments, for transmission of stress waves, emanating from said journal roller bearing segments toward said means and impinging thereon, in directions such that concentration of stress wave energy within said journal immediately underlying said journal arcuate bearing segments are minimized.

12. A drill bit comprising: at least one support journal including journal ball and roller raceways; a cutter supported by said journal and including a bore providing cutter ball and roller raceways respectively complementary to said journal raceways; complements of ball and roller bearings respectively in said complementary ball and roller raceways respectively longitudinally interlocking and rotatably mounting said cutter with respect to said journal and adapted to progress about the journal as the cutter is rotated under load, such that at any time only a few bearings of each complement transmit the principal drilling loads from said cutter to said journal; arcuate bearing surface within said journal roller raceway defined by the progressing of said few bearings thereacross under load; a ball retainer diagonally disposed within said journal in ball-retaining relation to said journal ball raceway; and a passageway in said journal providing a free surface in unshielded relation to stress waves emanating from said arcuate bearing surface intermediate said arcuate bearing surface and said ball retainer, said passageway having a centerline disposed with respect to the arcuate surface of said journal raceway such that if projected thereon in the direction of a perpendicular to the centerline of said journal lying in a plane including the axis of the drill bit, the projection of the centerline of said passageway subtends an angle with respect to a line element of the surface of said journal raceway.

13. A drill bit of the type described comprising: at least one cutter rotatably mounted on a support journal by means of complements of ball and roller bearings respectively running in complementary ball and roller raceways provided in said cutter and about said support journal; said complement of roller bearings, when said cutter is revolved, as when said bit is rotated in drilling, adapted to progress about said journal raceway and transmit drilling loads from said cutter thereto with only a few roller bearings undergoing load at any point of time; an arcuate area on said journal roller raceway defined by said few roller bearings undergoing load and progressing thereacross; a ball bearing retainer diagonally extending within said journal in ball-conducting relation to the ball bearing raceway of said journal; and means, disposed in said journal in shielding relation to said ball retainer and in unshielded relation to said arcuate area with respect to stress waves emanating from said arcuate area, for transforming stress waves impinging thereon and further disposed for transmission of stress waves transformed thereby into portions of said journals such that concentrations of transformed stress waves in journal portions immediately underlying said arcuate area are minimized.

14. A drill bit comprising: at least one cutter rotatably mounted on a support journal by means of a complement of roller bearings; said bearings of said complement, when said cutter is revolved responsive to bit rotation as during drilling, adapted to progress about said support journal and transmit drilling loads from said cutter thereto with only a few bearings of said complement undergoing substantial load at any time; an arcuate area on said journal defined by said few bearings undergoing load in progressing thereacross; a member extending within said support journal in skewed relation to the axis thereof; and means, disposed in said support journal intermediate said member and said arcuate surface and in unshielded relation to stress waves emanating from said arcuate surface, for transmitting any of said stress waves impinging thereon in directions within said support journal such that concentrations of stress waves within portions of said support journal immediately underlying said arcuate area are minimized.

15. A cutter support for a roller drill bit including: a journal having ball and roller raceways; said journal incorporating stress wave directing means directly above a lower loadable arcuate segment of said roller raceway for directing stress waves, emanating from the lower loadable arcuate segment of said roller raceway and impinging on said means, in directions such that the number of stress waves directed by said means toward said arcuate segment is minimized.

16. A cutter support for a roller drill bit including: a journal having ball and roller raceways; said journal incorporating stress wave reflecting means directly above a lower loadable arcuate segment of said roller raceway for reflecting stress waves, emanating from the lower loadable arcuate segment of said roller raceway and impinging on said means, in directions such that the number of stress waves reflecting by said means toward said arcuate segment is minimized.

17. A support for a rotating member including: a journal having a roller raceway; said journal incorporating stress wave directing means directly above a lower loadable arcuate segment of said roller raceway for directing stress waves, emanating from the lower loadable arcuate segment of said roller raceway and impinging on said means, in directions such that the number of stress waves directed by said means toward said arcuate segment is minimized.

18. A cutter support for a roller drill bit including a journal having ball and roller raceways, said journal having a bore extending therewithin and directly above a lower loadable arcuate segment of said roller raceway, said bore having a non-circular cross-section.

References Cited by the Examiner
UNITED STATES PATENTS

| | | | |
|---|---|---|---|
| 2,060,989 | 11/36 | Harrington | 308—8.2 |
| 2,595,904 | 5/52 | Swart | 308—8.2 |
| 2,904,374 | 9/59 | Boice | 308—8.2 |

ROBERT C. RIORDON, *Primary Examiner.*

FRANK SUSKO, *Examiner.*